(12) United States Patent
Tokoro et al.

(10) Patent No.: US 12,325,975 B2
(45) Date of Patent: Jun. 10, 2025

(54) DATA TRANSMISSION SYSTEM, WORK MACHINE, AND DATA TRANSMISSION METHOD FOR WORK MACHINE

(71) Applicant: Komatsu Ltd., Tokyo (JP)

(72) Inventors: Kenji Tokoro, Tokyo (JP); Shinsuke Kiyono, Tokyo (JP); Hokuto Ninomiya, Tokyo (JP); Taiki Wakizaka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 186 days.

(21) Appl. No.: 18/024,573

(22) PCT Filed: Oct. 18, 2021

(86) PCT No.: PCT/JP2021/038425
§ 371 (c)(1),
(2) Date: Mar. 3, 2023

(87) PCT Pub. No.: WO2022/091839
PCT Pub. Date: May 5, 2022

(65) Prior Publication Data
US 2023/0313497 A1    Oct. 5, 2023

(30) Foreign Application Priority Data
Oct. 30, 2020    (JP) .................................. 2020-182483

(51) Int. Cl.
*E02F 9/20*    (2006.01)
*G07C 5/00*    (2006.01)
*G07C 5/08*    (2006.01)

(52) U.S. Cl.
CPC ............ *E02F 9/2054* (2013.01); *G07C 5/008* (2013.01); *G07C 5/085* (2013.01)

(58) Field of Classification Search
CPC ........ E02F 9/2054; G07C 5/008; G07C 5/085
See application file for complete search history.

(56) References Cited

U.S. PATENT DOCUMENTS

| 8,015,245 B2 * | 9/2011 | Milic-Frayling ... H04L 61/4547 709/204 |
| 2015/0293702 A1* | 10/2015 | Fujimori ................ G07C 5/085 711/154 |
| 2015/0371464 A1 | 12/2015 | Fujimori et al. |
| 2020/0080287 A1 | 3/2020 | Shimano et al. |
| 2020/0399863 A1 | 12/2020 | Aizawa et al. |

FOREIGN PATENT DOCUMENTS

| CN | 110799709 A | 2/2020 |
| JP | 2011-055216 A | 3/2011 |
| JP | 2014-177816 A | 9/2014 |
| JP | 2016-032232 A | 3/2016 |
| WO | 2019/172424 A1 | 9/2019 |

* cited by examiner

Primary Examiner — Gertrude Arthur Jeanglaude
(74) Attorney, Agent, or Firm — Troutman Pepper Locke LLP

(57) ABSTRACT

Provided is a data transmission system for a work machine, including: a customization definition receiving unit configured to receive customization definition information indicating the contents of processing on data collected from the work machine and a validity period of the processing, and a transmission unit configured to transmit to an external device, the data in accordance with the contents of the processing in the validity period indicated by the received customization definition information.

19 Claims, 5 Drawing Sheets

| IDENTIFIER | VALUE | TIMESTAMP |
|---|---|---|
| X1 | ******** | XXXX/XX/XX 00:00:01 |

FIG. 6

| COMMON DEFINITION | |
|---|---|
| SETTING SEQUENCE NUMBER | ... |
| START/END DATES AND TIMES | ... |
| PRIORITY | ... |

FIG. 7

| PROCESSING DEFINITION | |
|---|---|
| PROCESSING FORMAT | ... |
| EVENT LIST | ... |
| DATA LIST | ... |
| AGGREGATION PERIOD | ... |
| FORMING PERIOD | ... |

FIG. 8

| TRANSMISSION DEFINITION | |
|---|---|
| DATA TRANSMISSION TIMING | ... |
| TRANSMISSION DESTINATION LIST | ... |

FIG. 9

| CONDITION DEFINITION | |
|---|---|
| CONDITION KEY | ... |
| CONDITION FUNCTION | ... |

DATA TRANSMISSION SYSTEM, WORK MACHINE, AND DATA TRANSMISSION METHOD FOR WORK MACHINE

TECHNICAL FIELD

The present invention relates to a data transmission system, a work machine, and a data transmission method for the work machine. Priority is claimed on Japanese Patent Application No. 2020-182483, filed Oct. 30, 2020, the content of which is incorporated herein by reference.

BACKGROUND ART

Patent Literature 1 describes designating work machine information, which is data to be collected, based on definition information.

CITATION LIST

Patent Literature

[Patent Literature 1]
Japanese Unexamined Patent Application, First Publication No. 2014-177816

SUMMARY OF INVENTION

Technical Problem

In general, for the convenience of the user, a work machine is configured to process raw data, which is various types of unprocessed data output from the main body of the work machine, into a form that is easy for the user to interpret and analyze, and then transmit the processed data. At this time, the transmission mode such as the processing format and the transmission timing of the raw data from the work machine is incorporated at the manufacturing stage of the work machine, based on the assumed needs of the user.

Since the usage patterns of work machine and the required data differ depending on a user, the transmission mode incorporated at the manufacturing stage does not necessarily match what the user desires. In other words, after shipment, there is a need for the user to freely customize the transmission mode of data output from the work machine.

The present disclosure has been made in view of the above circumstances, and an object of the present disclosure is to provide a data transmission device for a work machine capable of customizing the transmission mode of various types of data from the work machine as desired, the work machine, and a data transmission method.

Solution to Problem

According to one aspect of the present disclosure, a data transmission system for a work machine includes: a customization definition receiving unit configured to receive customization definition information indicating the contents of processing on data collected from the work machine and a validity period of the processing, and a transmission unit configured to transmit to an external device, the data in accordance with the contents of the processing in the validity period indicated by the received customization definition information.

Advantageous Effects of Invention

According to a data transmission system for a work machine, the work machine, and a data transmission method for the work machine according to the present disclosure, it is possible to customize the transmission mode of various types of data from the work machine as desired.

BRIEF DESCRIPTION OF DRAWINGS

FIG. 6 is a diagram showing the data structure of common definition according to the first embodiment.
FIG. 7 is a diagram showing the data structure of processing definition according to the first embodiment.
FIG. 8 is a diagram showing the data structure of transmission definition according to the first embodiment.
FIG. 9 is a diagram showing the data structure of condition definition according to the first embodiment.

DESCRIPTION OF EMBODIMENTS

First Embodiment

Figures 1, 2:
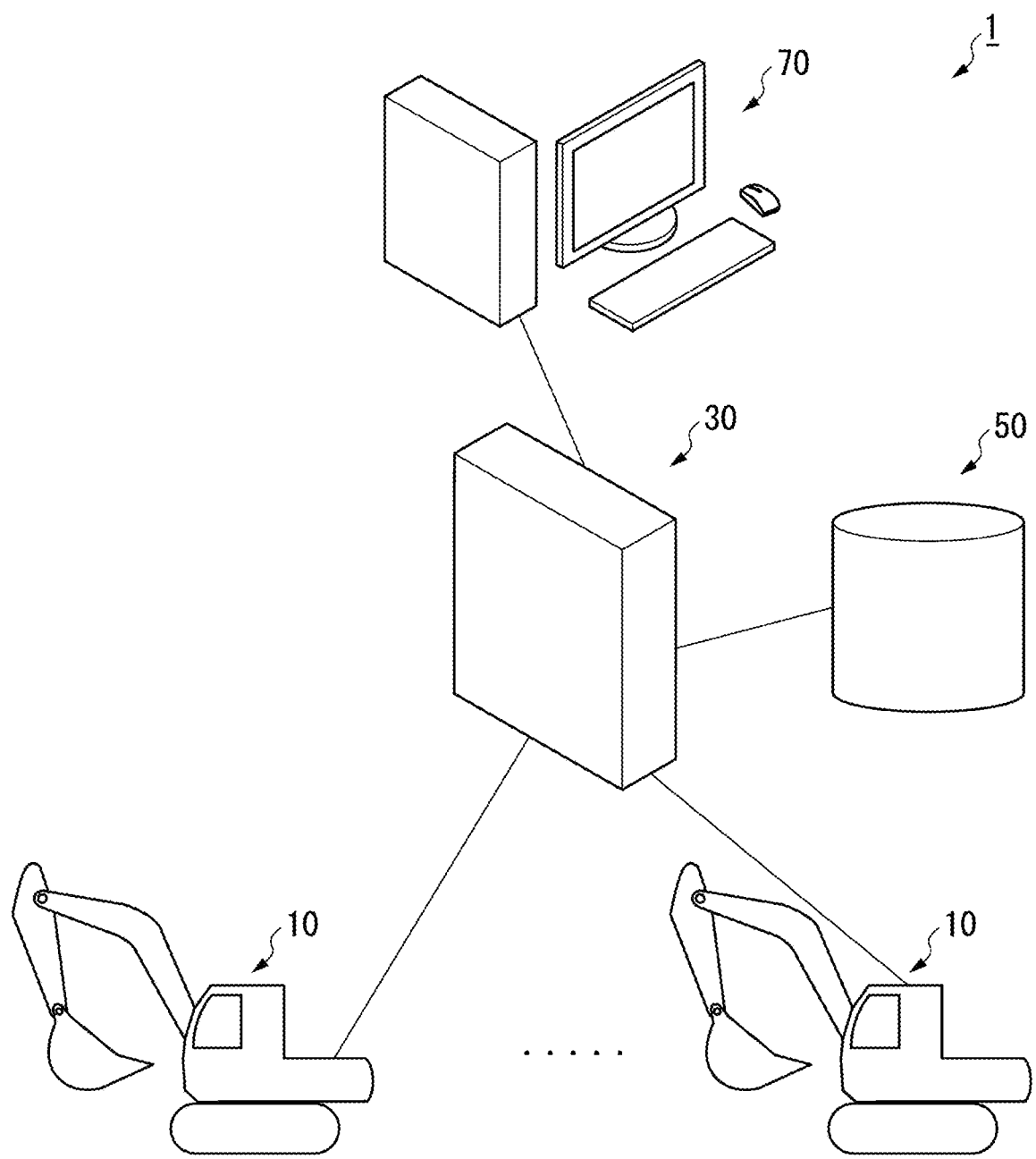
FIG. 1 is a diagram showing the overall configuration of a data providing system according to a first embodiment.
FIG. 2 is a diagram showing a unified format.

A data transmission device and a data providing system including the same according to a first embodiment will be described in detail below with reference to FIGS. 1 to 9.
(Overall Configuration)
FIG. 1 is a diagram showing the overall configuration of a data providing system according to a first embodiment.

A data providing system 1 provides data related to a plurality of work machines 10 for use by users. The data providing system 1 includes a plurality of work machines 10, a data server 30, a definition database 50, and a user device 70. Each work machine 10 collects data related to the work machine 10 and transmits the collected data to the data server 30. The data server 30 stores the data collected from the plurality of work machines 10, and provides the data to the user device 70. The definition database 50 stores information required when the data server 30 provides data. The user device 70 sets conditions for data to be collected by work machine 10, and acquires data related to the work machine 10 from the data server 30.

When communicating the data related to the work machine 10 between the work machine 10 and the data server 30 and between the data server 30 and the user device 70, communication is performed using unit data related to a unified format. The unified format is a unit data format in which one type of data value is stored. The work machine 10 stores a plurality of values included in the unit data of CAN collected from each component in each unit data of a unified format, and transmits the unit data to the data server 30. The data server 30 and the user device 70 are examples of external devices outside the vehicle. The unit data is also called a data frame, a packet, or a Protocol Data Unit (PDU).

Hereinafter, the unit data in the unified format will be called a unified data object.

FIG. 2 is a diagram showing the unified format.

The unified format stores an identifier indicating a type of data, a value of the data, and a timestamp indicating a time when a component acquires the data. Only one identifier, one value, and one timestamp are stored in one unified data object.

<<Configuration of Work Machine 10>>

Figure 3:
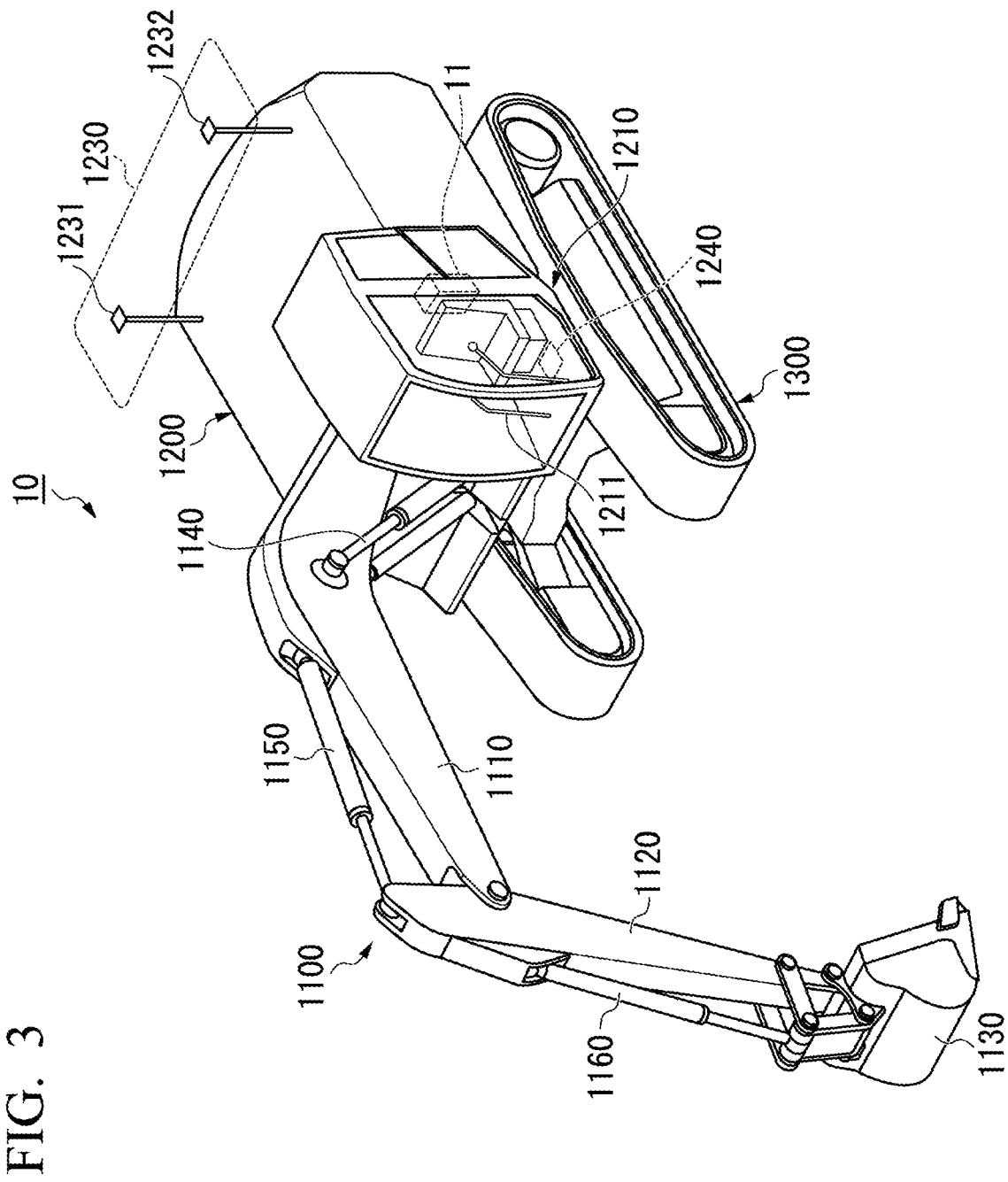
FIG. 3 is a perspective view showing the appearance of a work machine.

FIG. 3 is a perspective view showing the appearance of the hydraulic excavator that is the work machine 10.

The work machine 10 that is a work machine includes a work equipment 1100 that operates hydraulically, a swing body 1200 that supports the work equipment 1100, and a traveling body 1300 that supports the swing body 1200. Here, a portion of the swing body 1200 to which the work equipment 1100 is attached is called a front portion. In addition, with respect to the swing body 1200, on the basis of the front portion, the opposite portion is referred to as a rear portion, a portion on the left side is referred to as a left portion, and a portion on the right side is referred to as a right portion.

<<Work Equipment 1100>>

The work equipment 1100 includes a boom 1110, an arm 1120, a bucket 1130, a boom cylinder 1140, an arm cylinder 1150, and a bucket cylinder 1160.

The boom 1110 is a strut that supports the arm 1120 and the bucket 1130. The base end of the boom 1110 is attached to the front part of the swing body 1200 via a pin.

The arm 1120 connects the boom 1110 and the bucket 1130. The base end of the arm 1120 is attached to the tip of the boom 1110 via a pin.

The bucket 1130 is a container having a blade for excavating earth. The base end of the bucket 1130 is attached to the tip of the arm 1120 via a pin.

The boom cylinder 1140 is a hydraulic cylinder for operating the boom 1110. The base end of the boom cylinder 1140 is attached to the swing body 1200. The tip of the boom cylinder 1140 is attached to the boom 1110.

The arm cylinder 1150 is a hydraulic cylinder for driving the arm 1120. The base end of the arm cylinder 1150 is attached to the boom 1110. The tip of the arm cylinder 1150 is attached to the arm 1120.

The bucket cylinder 1160 is a hydraulic cylinder for driving the bucket 1130. The base end of the bucket cylinder 1160 is attached to the arm 1120. The tip of the bucket cylinder 1160 is attached to a link member connected to the bucket 1130.

<<Swing Body 1200>>

The swing body 1200 is provided with a cab 1210 in which an operator rides. The cab 1210 is provided in front of the swing body 1200 and on the left side of the work equipment 1100.

An operating device 1211 for operating the work equipment 1100 is provided inside the cab 1210. In accordance with the amount of operation of the operating device 1211, hydraulic oil is supplied to the boom cylinder 1140, the arm cylinder 1150, and the bucket cylinder 1160 to drive the work equipment 1100.

<<Component>>

The work machine 10 includes a position and azimuth direction calculator 1230 and a tilt detector 1240. The position and azimuth direction calculator 1230 and the tilt detector 1240 are examples of components. The work machine 10 also includes a data transmission device 11 that collects data related to the work machine 10 and transmits the data to the data server 30. The data transmission device 11 is provided in the cab 1210. Note that the data transmission device 11 may be provided outside the cab 1210 on the swing body 1200, for example. A control component 12 and an extension component 14 described below may similarly be provided inside the cab 1210 or may be provided outside the cab 1210.

The position and azimuth direction calculator 1230 calculates the position of the swing body 1200 and the azimuth direction to which the swing body 1200 faces. The position and azimuth direction calculator 1230 includes a first receiver 1231 and a second receiver 1232 that receive positioning signals from artificial satellites that configure a Global Navigation Satellite System (GNSS). The first receiver 1231 and the second receiver 1232 are installed at different positions on the swing body 1200, respectively. The position and azimuth direction calculator 1230 detects the position of the representative point O (origin of the vehicle body coordinate system) of the swing body 1200 in the field coordinate system, based on the positioning signal received by the first receiver 1231.

The position and azimuth direction calculator 1230 uses the positioning signal received by the first receiver 1231 and the positioning signal received by the second receiver 1232 to calculate the azimuth direction of the swing body 1200, as the relationship between the detected installation position of the first receiver 1231 and the installation position of the second receiver 1232.

The tilt detector 1240 measures the acceleration and angular velocity of the swing body 1200, and based on the measurement results, detects the tilt of the swing body 1200 (for example, roll representing rotation about the Xm axis, pitch representing rotation about the Ym axis, and yaw representing rotation about the Zm axis). The tilt detector 1240 is installed, for example, on the bottom surface of the cab 1210. The tilt detector 1240 can use, for example, an inertial measurement unit (IMU).

Figure 4:
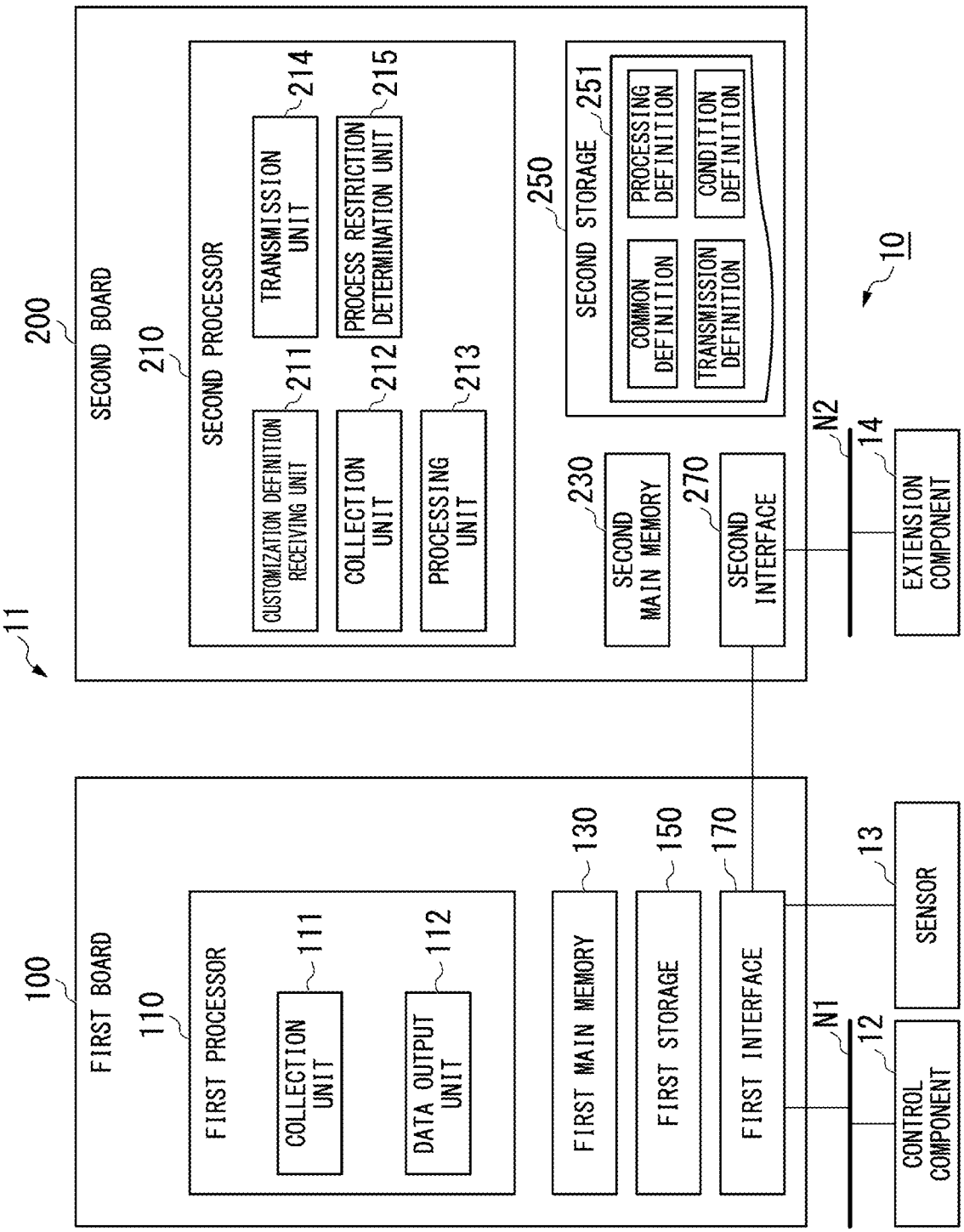
FIG. 4 is a block diagram showing the configuration of the work machine according to the first embodiment.

FIG. 4 is a block diagram showing the configuration of the work machine 10 according to the first embodiment.

The data transmission device 11 includes a first board 100 and a second board 200 which are physically separated. The first board 100 configures a computer that runs a real-time Operating System (OS). The second board 200 configures a computer that runs a general-purpose OS.

The first board 100 includes a first processor 110, a first main memory 130, a first storage 150, and a first interface 170. The first processor 110 reads a program from the first storage 150, develops it in the first main memory 130, and executes a predetermined process according to the program. The first interface 170 is connected with a plurality of control components 12 for controlling the work machine 10 via a first network N1.

Examples of the control component 12 include an engine control component that acquires various types of engine-related data from sensors and performs engine-related control, a hydraulic control component that acquires various types of data related to the hydraulic equipment that controls the operation of the work equipment 1100 by using a sensor and controls the hydraulic equipment, a monitor control component that acquires data from various sensors of the work machine 10 and controls the display of a monitor (not shown), a communication component that controls communication equipment for communicating with an external server, or the like, and acquires data from various sensors of a work machine, or the like.

The first network N1 is CAN, for example. The first interface 170 is also connected to a sensor 13 that detects the state quantity of the work machine 10. The control component 12 and the sensor 13 are examples of components mounted on the work machine 10. The basic operational control of the work machine 10 is performed by the control component 12 connected to the first network N1.

The second board 200 includes a second processor 210, a second main memory 230, a second storage 250, and a second interface 270. The second processor 210 reads a program from the second storage 250, develops it in the second main memory 230, and executes a predetermined process according to the program. The second interface 270 is connected to a plurality of extension components 14 for expanding the functions of the work machine 10 via the second network N2.

Examples of the extension component 14 include an image display component that performs a predetermined image process on an image captured by a camera and controls the display, a machine guidance component that displays and controls a guidance monitor for providing guidance to the operator regarding the positional relationship between the design surface of the construction site and the work machine 10, a payload component for measuring the amount of soil excavated by the work equipment 1100, or the like. The second network N2 is CAN or Ethernet (registered trademark), for example. The extension component 14 is an example of a component mounted on the work machine 10. Extended information is provided to the work machine 10 and the operator by the extension component 14 connected to the second network N2.

Components that can be mounted on the work machine 10 are not limited to the control component 12, the sensor 13, and the extension component 14 described above. For example, the component may be a display controller that controls the display function of the work machine 10, a communication controller that controls the communication function of the work machine 10, or the like.

The first interface 170 and the second interface 270 are communicatively connected to each other.

The program stored in the first storage 150 or the second storage 250 may implement some of the functions to be exhibited on the first board 100 or the second board 200. For example, the program may exhibit the functions in combination with another program already stored in the first storage 150 or the second storage 250, or in combination with another program installed in another device.

In other embodiments, the first board 100 or the second board 200 may include a custom Large Scale Integrated Circuit (LSI) such as a Programmable Logic Device (PLD) in addition to or instead of the above configuration. Examples of PLD include Programmable Array Logic (PAL), Generic Array Logic (GAL), Complex Programmable Logic Device (CPLD), and Field Programmable Gate Array (FPGA). In this case, part or all of the functions implemented by the first board 100 or the second board 200 may be implemented by the integrated circuit.

Examples of the first storage 150 and the second storage 250 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory.

The first storage 150 and the second storage 250 may be internal media directly connected to the bus line, or external media connected to the data transmission device 11 via the first interface 170 or a communication line. Further, this program may be transmitted to the data transmission device 11 via a communication line, and the first processor 110 or the second processor 210 may execute the program. In at least one embodiment, the first storage 150 and the second storage 250 are a non-transitory tangible storage medium.

The first processor 110 functions as a collection unit 111 and a data output unit 112 by executing programs stored in the first storage 150.

The collection unit 111 collects various types of data output from the control component 12 or the sensor 13.

The data output unit 112 outputs various types of data collected by the collection unit 111 to the second board 200.

The second processor 210 functions as a customization definition receiving unit 211, a collection unit 212, a processing unit 213, a transmission unit 214, and a process restriction determination unit 215 by executing programs stored in the second storage 250. Further, in the second storage 250, a storage area for a customization definition file 251, which is customization definition information, is secured.

The customization definition receiving unit 211 receives the customization definition file 251 from the user device 70 and records it in the second storage 250. This customization definition file 251 is a file that can be edited by the user, and is a file that defines data desired by the user to be processed by a method desired by the user and transmitted to a transmission destination at a desired timing. As shown in FIG. 4, the customization definition file 251 consists of four definitions: common definition, processing definition, transmission definition, and condition definition. Specific contents of these will be described later.

The collection unit 212 collects various types of data output from the extension component 14. The collection unit 212 also acquires various types of data collected by the collection unit 111, via the data output unit 112 of the first processor 110.

The processing unit 213 processes various types of data collected by the collection units 111 and 212, according to the processing definition included in the customization definition file 251.

The transmission unit 214 transmits to the data server 30 the processed data, which is data processed according to the transmission definition included in the customization definition file 251. The user views the processed data file with a dedicated application or the like to interpret and analyze information about the work machine 10.

Note that the transmission unit 214 may transmit not only the processed data file but also unprocessed raw data.

The process restriction determination unit 215 determines whether or not all of the customization definition files 251 can be executed in view of the current situation of the work machine 10, when there are a plurality of customization definition files 251.

The data transmission device 11 may be a single computer, or a plurality of computers into which the configuration of the data transmission device 11 is divided and which cooperate with each other to function as a data transmission system for the work machine. The work machine 10 may include a plurality of computers that function as the data transmission device 11. Part of the computers configuring the data transmission device 11 may be installed inside the work machine 10 and the other computers may be installed outside the work machine 10.

Note that the single data transmission device 11 described above is also an example of a data transmission system. In another embodiment, part of the components configuring the data transmission system may be installed inside the work machine 10 and other components may be provided outside the work machine 10.

In another embodiment, the first board 100 and the second board 200 are not separated as hardware, but may be a single board.

(Processing Flow of Data Transmission Device)

Figure 5:
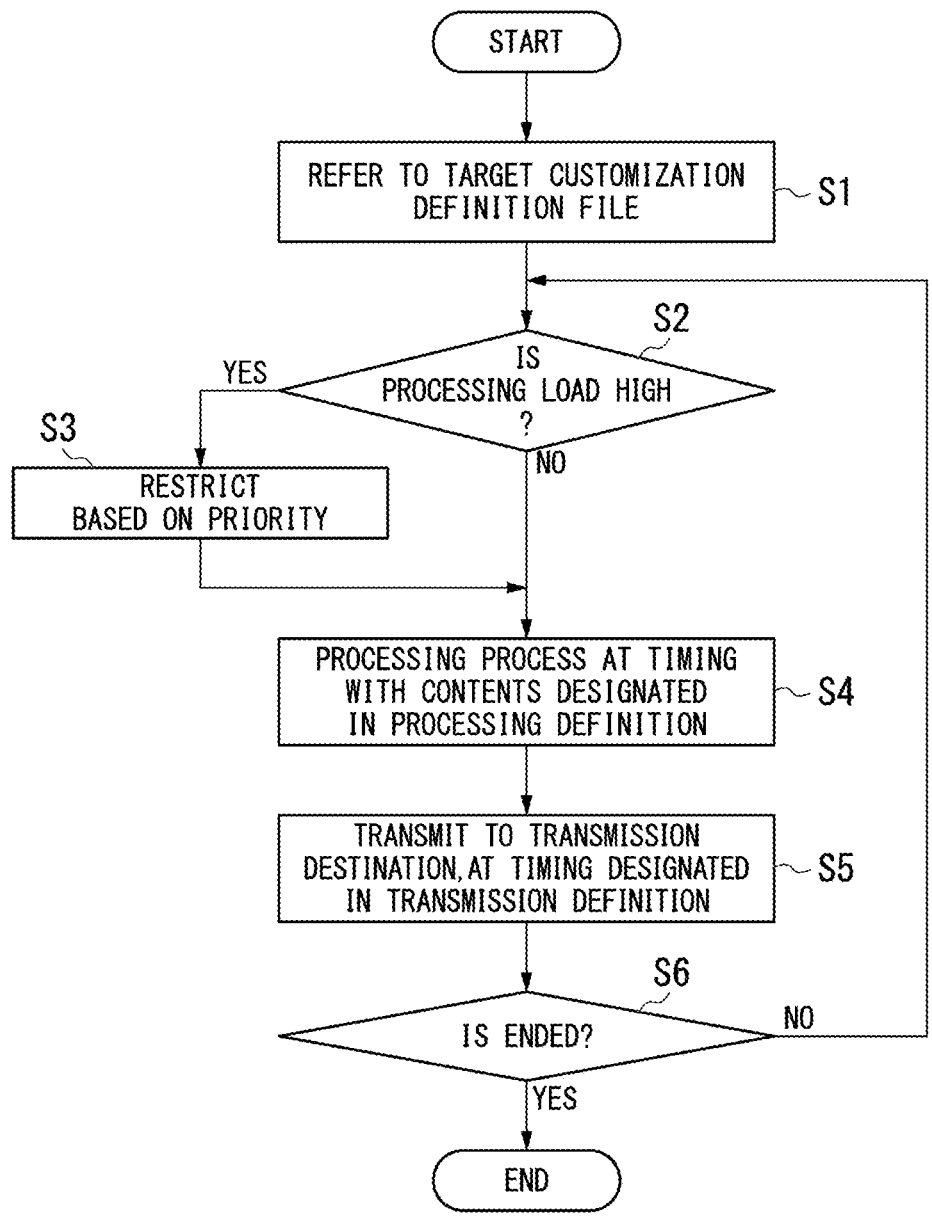
FIG. 5 is a diagram showing a processing flow of a data transmission system according to the first embodiment.

FIG. 5 is a diagram showing a processing flow of a data transmission device according to the first embodiment.

The processing flow shown in FIG. 5 is executed, for example, when the work machine 10 is initially started.

As shown in FIG. 5, the data transmission device 11 first refers to the customization definition file 251 (step S1). This customization definition file 251 is edited in advance by the user, transmitted from the user device 70, and stored in the second storage 250. One customization definition file 251 is prepared for each piece of data that the user wants to acquire. In the process of step S1, the data transmission device 11 refers to the validity period designated in each customization definition file 251, and extracts only the customization definition files 251 that satisfy the validity period condition. For the validity period, for example, "start/end dates and times", which will be described later, can be designated. The customization definition files 251 that do not satisfy the validity period condition are not executed.

Next, the process restriction determination unit 215 determines whether or not the processing load is high (step S2). For example, it is assumed a case where the load on the second processor 210 temporarily increases, and a case where execution of all significantly many customization definition files 251 stored in the second storage 250 interferes with the process by a processor. When such a situation is detected (step S2; YES), the process restriction determination unit 215 restricts the customization definition files 251 to be executed, according to the priority designated in advance to each customization definition file 251 (step S3).

Subsequently, the processing unit 213 sequentially performs a processing process, according to the contents of the processing definition included in the customization definition file 251 (step S4). Here, apart from the processing flow shown in FIG. 5, the collection unit 111 of the first processor 110 and the collection unit 212 of the second processor 210 collect various types of data from time to time at a predetermined sampling cycle, from components, sensors, or the like connected to the first network N1 and the second network N2, respectively. The processing unit 213 refers to the various types of data collected in this way, and similarly performs a processing process on the data of the type designated in the customization definition file 251 moment by moment at each cycle designated in the customization definition file 251.

Note that when step S3 has not been performed, the processing unit 213 refers to all the customization definition files 251, and performs the processing process defined in each customization definition file 251. Further, when step S3 has not been performed, the processing unit 213 refers to only some customization definition files 251 based on the priority, and performs the processing process defined in each customization definition file.

The transmission unit 214 sequentially performs transmission, according to the contents of the transmission definition included in the customization definition file 251 (step S5).

The data transmission device 11 ends the process, when a predetermined end condition is satisfied (step S6; YES), such as when an operation to stop the work machine 10 is received or when the validity period expires.

On the other hand, while the end condition is not satisfied (step S6; NO), the processes of steps S2 to S5 are repeatedly executed.

(Description of Customization Definition File)

FIGS. 6 to 9 are explanatory diagrams of the customization definition file according to the first embodiment.

The contents of the customization definition file will be described in detail below with reference to FIGS. 6 to 9.

Common Definition

FIG. 6 shows an example of the data structure of common definition.

As shown in FIG. 6, the common definition designates a setting sequence number, start/end dates and times, and priority.

A setting sequence number is a number uniquely assigned to each of a plurality of customization definition files 251 recorded, in one work machine 10. The user can edit each customization definition file 251 as desired, by designating this setting sequence number. When a user wants to add a new customization definition file 251 to a certain one work machine 10, the user transmits the customization definition file 251 with a new setting sequence number to the target work machine 10.

The start/end dates and times are information indicating the validity period of this customization definition file 251. As described in step S1 of FIG. 5, the data transmission device 11 extracts the customization definition file 251 whose current dates and times are within the validity period, considers the extracted file to be valid and makes it an execution object. By designating the start/end dates and times, the user can perform customization such that the necessary information can be acquired only during the necessary period.

In this way, in the customization definition file 251, a period during which the customization definition file 251 is valid is designated, and the processing unit 213 and the transmission unit 214 perform processing and transmission according to the customization definition file 251 only during the period in which the customization definition file 251 is valid.

Therefore, data according to the customization definition file is transmitted to the data server 30, during the period in which the customization definition file 251 is valid. Further, when the data to be transmitted as standard from the work machine 10 to the data server 30 and other customization definition files 251 are also within the validity period, in addition to the data according to the customization definition file, data to be transmitted as standard and data according to other customization definition files are transmitted to the data server 30. On the other hand, when the customization definition file 251 is out of validity period, and the data to be transmitted as standard from the work machine 10 to the data server 30 and other customization definition files 251 are within the validity period, only data to be transmitted as standard and data according to other customization definition files are transmitted to the data server 30.

Note that the data transmission device 11 may delete the customization definition file 251 whose validity period has passed, for example, the end date and time have passed. The storage capacity of the second storage 250 can be reduced by deleting the customization definition file 251 whose validity period has passed.

It should be noted that data to be transmitted from the work machine 10 to the data server 30 as standard may be defined in the customization definition file 251.

The priority is information indicating the priority of the customization definition file 251, and is represented by a numerical value from 1 to 100, for example. The higher the number, the higher the priority. As described above, when it is assumed that the processing load on the work machine 10 is excessive, the process restriction determination unit 215 selects the customization definition file 251 according to this priority, and performs adjustment such that the processing load does not exceed the limit.

In this manner, the customization definition file 251 designates the priority of the customization definition file 251. Then, when it is determined that the processing load is excessive, the processing unit 213 and the transmission unit 214 perform processing and transmission, according to the customization definition file, in descending order of priority from the customization definition file with the highest priority. It should be noted that regardless of the processing load, processing and transmission may be performed, according to the customization definition file, in descending order of the priority of the customization definition file. Alternatively, a threshold value may be set for the priority numerical value, and processing and transmission may be performed according to a priority customization definition file larger than the threshold value.

Processing Definition

FIG. 7 shows an example of the data structure of processing definition.

As shown in FIG. 7, the processing definition designates a processing format, an event list, a data list, an aggregation period, a forming period, or the like.

The processing format is information designating what format in which the raw data collected by the collection units 111 and 212 is to be processed. For example, data formats such as trend, history, map, and snap are designated as the processing format.

The event list is a list created by citing condition keys separately defined in the condition definitions described later. The event is defined as, for example, "when the key is turned on/off", "when an error occurs", "when the engine water temperature exceeds a predetermined value", and the like. The user can define any condition as an event in the event definition described later. The processing unit 213 can process and generate various types of data triggered by events defined in this event list.

The data list is a list of data items to be acquired, such as an engine water temperature and an engine speed. In the data list, an average value, a maximum value, a minimum value, or the like can also be designated.

The aggregation period is information that designates a cycle in which the above-described processing is applied to the collected raw data. For each aggregation period, one piece of aggregation data processed as described above is added to the sampling data collected during that period.

The forming period is information that designates the cycle of forming the data file. One data file is formed with the aggregation data aggregated during this forming period.

Transmission Definition

FIG. 8 shows an example of the data structure of transmission definition.

As shown in FIG. 8, the transmission definition designates a data transmission timing, a transmission destination list, or the like.

The data transmission timing is information designating the timing at which the processed data generated by executing the customization definition file 251 is transmitted to the transmission destination. The data transmission timing can be designated by citing a condition key defined in the event definition described later, such as "after 30 minutes from key-off detection time".

In this way, since the data transmission timing can be designated for each customization definition file 251, for example, the transmission timing can be customized to be shifted for each work machine 10, and adjustments can be made such that the load on the data server 30 is not concentrated.

The transmission destination list is information indicating transmission destinations of processed data, and in the present embodiment, the address of the data server 30 is designated. It should be noted that a plurality of destinations and routes can be designated in the transmission destination list. With respect to the transmission destination, by preparing a plurality of data servers or designating that transmission is to be made to the same data server via different routes, it is possible to perform adjustment such that communication traffic on a specific data server or on a specific route does not become excessive. Different routes can be set by setting a communication method such as mobile communication or satellite communication.

Condition Definition

FIG. 9 shows an example of the data structure of condition definition.

As shown in FIG. 9, the condition definition designates a condition key, a condition function, or the like.

The condition key is key information indicating an event linked to a condition function described later. It is possible to designate desired event in each of the processing definition and the transmission definition described above, by describing this condition key in each definition.

The condition function is information indicating the contents of an event. Specifically, conditional expressions corresponding to "when the key is turned on/off", "when an error occurs", and "when the engine water temperature exceeds a predetermined value" are described.

In this way, the customization definition file 251 has a format in which condition definitions can be designated separately from other definitions. When various event conditions are individually defined for each of the processing definition and the transmission definition, the editing work on the user side becomes complicated. However, by defining a condition key that can be commonly handled in the customization definition file 251 in the condition definition, it is possible to improve the convenience of editing the processing definition and the transmission definition.

Action, Effect

As described above, a data transmission device 11 according to the first embodiment includes: a customization definition receiving unit 211 that receives customization definition information indicating contents of various processes on data acquired from a work machine 10; a processing unit 213 that processes the data acquired from the work machine 10 in accordance with processing definition of the received customization definition information; and a transmission unit 214 that transmits processed data, which is data processed in accordance with transmission definition of the received customization definition information, to a data server 30, which is an external device.

According to such a configuration, the user can desirably customize the transmission mode of the work machine 10 by desirably editing the customization definition file.

The procedures of various processes of the data collection device described above are stored in a computer-readable recording medium in the form of programs, and the various processes are performed by reading and executing the programs by a computer. The computer-readable recording media include magnetic disks, magneto-optical disks, CD-ROMs, DVD-ROMs, semiconductor memories, and the like. Alternatively, the computer program may be transmitted to a computer via a communication line, and the computer receiving the transmission may execute the program.

The above program may be for implementing a part of the above-described functions. Further, the program may be a so-called differential file or a differential program which achieves the above-described function in combination with programs already recorded in the computer system.

Although several embodiments of the present disclosure have been described above, these embodiments are presented by way of example and are not intended to limit the scope of the disclosure. These embodiments can be implemented in various other forms, and various omissions, replacements, and modifications can be made without departing from the gist of the disclosure.

Further, although the work machine 10 according to the above-described embodiment is a hydraulic excavator, it is not limited to this. For example, the work machine 10 according to other embodiments may be other work machines such as a dump truck, a bulldozer, and a wheel loader.

INDUSTRIAL APPLICABILITY

According to each aspect of the present invention, the transmission mode of various types of data from a work machine can be customized as desired.

REFERENCE SIGNS LIST

1: Data providing system
10: Work machine
11: Data transmission device
100: First board
200: Second board
110: First processor
130: First main memory
150: First storage
170: First interface
210: Second processor
230: Second main memory
250: Second storage
270: Second interface
12: Control component
13: Sensor
14: Extension component
N1: First network
N2: Second network
111: Collection unit
112: Data output unit
211: Customization definition receiving unit
212: Collection unit
213: Processing unit
214: Transmission unit
215: Process restriction determination unit
251: Customization definition file

The invention claimed is:

1. A data transmission system for a work machine, comprising:
a processor, the processor being configured to:
receive user defined customization definition information from a user device indicating contents of a process on data collected from the work machine and indicating a validity period of the process; and
transmit the data to an external device in accordance with the contents of the process, only during the validity period of the received user defined customization definition information, wherein the processor is configured to only process and transmit the data for which the validity period is still valid,
wherein a priority of the user defined customization definition information is designated in the user defined customization definition information, and the process is performed, according to the user defined customization definition information, in descending order of the priority.

2. The data transmission system for a work machine according to claim 1, the processor further configured to:
process the data in accordance with the contents of the process only during the validity period of the received user defined customization definition information.

3. The data transmission system for a work machine according to claim 2, wherein
the contents of the process include data to be transmitted to an outside, and processing contents of the data to be transmitted to the outside, among the data collected from the work machine,
the processor configured to processes the data to be transmitted to the outside in accordance with the processing contents, and
the transmission unit transmits the processed data to the external device.

4. The data transmission system for a work machine according to claim 1, wherein
the user defined customization definition information includes a setting sequence number.

5. The data transmission system for a work machine according to claim 1, wherein
a timing of data transmission is recorded in transmission definition included in the user defined customization definition information, and
the processor is configured to transmit processed data in accordance with a transmission timing designated in the transmission definition.

6. The data transmission system for a work machine according to claim 1, wherein
the user defined customization definition information defines an event condition that is commonly cited in a processing definition and a transmission definition included in the user defined customization definition information.

7. A work machine comprising:
the transmission system for a work machine according to claim 1.

8. The data transmission system for a work machine according to claim 1, further comprising:
wherein the processor is configured to process the data in accordance with the contents of the process during the validity period of the received user defined customization definition information.

9. The data transmission system for a work machine according to claim 3, wherein
the user defined customization definition information includes a setting sequence number.

10. The data transmission system for a work machine according to claim 4, wherein
the user defined customization definition information includes a setting sequence number.

11. The data transmission system for a work machine according to claim 3, wherein
a timing of data transmission is recorded in transmission definition included in the customization definition information, and the processor is configured to transmit processed data in accordance with a transmission timing designated in the transmission definition.

12. The data transmission system for a work machine according to claim 4, wherein
a timing of data transmission is recorded in transmission definition included in the customization definition information, and
the processor is configured to transmit processed data in accordance with a transmission timing designated in the transmission definition.

13. The data transmission system for a work machine according to claim 3, wherein
the user defined customization definition information defines an event condition that is commonly cited in a processing definition and a transmission definition included in the customization definition information.

14. The data transmission system for a work machine according to claim 4, wherein
the user defined customization definition information defines an event condition that is commonly cited in a processing definition and a transmission definition included in the user defined customization definition information.

15. A work machine comprising:
the transmission system for a work machine according to claim 2.

16. The data transmission system for a work machine according to claim 1, wherein
the processor is configured to determine a processing load and restrict the processing of the customization definition files to be executed, according to the priority designated in the user defined customization definition information based on the determined processing load.

17. The data transmission system for a work machine according to claim 16, wherein
with processing load determined to be high, the processor is configured to restrict the processing of the customization definition files to be executed, according to the priority designated in the user defined customization definition information.

18. The data transmission system for a work machine according to claim 1, wherein
the processor is configured to delete the customization definition file after expiration of the validity period.

19. A data transmission method for a work machine comprising:
a step of receiving user defined customization definition information from a user device indicating contents of a process on data collected from the work machine and indicating a validity period of the process; and
a step of transmitting the data to an external device in accordance with the contents of the process, only during the validity period of the received user defined customization definition information, wherein the step of transmitting occurs only for the data for which the validity period is still valid,
wherein a priority of the user defined customization definition information is designated in the user defined customization definition information, and the process is performed, according to the user defined customization definition information, in descending order of the priority.

* * * * *